United States Patent
McFarland et al.

(10) Patent No.: US 7,724,693 B2
(45) Date of Patent: May 25, 2010

(54) NETWORK DEPENDENT SIGNAL PROCESSING

(75) Inventors: Sheila Joy McFarland, Vancouver (CA); Phillip A. Hetherington, Port Moody (CA); Alex Escott, Vancouver (CA)

(73) Assignee: QNX Software Systems (Wavemakers), Inc., Vancouver, British Columbia ( * ) Notice: Subject to any disclaimer, the term of this patent is extended or adjusted under 35 U.S.C. 154(b) by 1170 days.

(21) Appl. No.: 11/218,742

(22) Filed: Sep. 2, 2005

(65) Prior Publication Data

US 2007/0025281 A1  Feb. 1, 2007

Related U.S. Application Data

(60) Provisional application No. 60/704,065, filed on Jul. 28, 2005.

(51) Int. Cl.
*H04B 3/20* (2006.01)
(52) U.S. Cl. .................. 370/286; 342/417; 358/400; 370/288; 375/296; 379/404; 379/406.01; 379/406.05; 379/406.08; 398/94
(58) Field of Classification Search ............... 370/286, 370/352, 252, 259, 401, 419, 468, 288; 455/570; 375/219, 296; 379/406.01, 417, 404, 406.05, 379/406.08; 713/152; 398/94; 358/400; 342/417
See application file for complete search history.

(56) References Cited

U.S. PATENT DOCUMENTS

| 4,760,596 | A | * | 7/1988 | Agrawal et al. | ........ 379/406.08 |
| 5,223,847 | A | * | 6/1993 | Minter | ........ 342/417 |
| 5,434,916 | A | * | 7/1995 | Hasegawa | ........ 379/406.02 |
| 5,483,551 | A | * | 1/1996 | Huang et al. | ........ 375/219 |
| 5,561,668 | A | * | 10/1996 | Genter | ........ 370/288 |

(Continued)

OTHER PUBLICATIONS

Linhard, Klaus et al., "Spectral Noise Subtraction with Recursive Gain Curves," *Daimler Benz AG, Research and Technology*, Jan. 9, 1998, 4 pages.

(Continued)

*Primary Examiner*—Gerald Gauthier
(74) *Attorney, Agent, or Firm*—Brinks Hofer Gilson & Lione

(57) ABSTRACT

A system processes signals exchanged between a near end terminal and a far end terminal over a communication path. The system selects the processing characteristics of a near end terminal based on characteristics of the communication path. The communication path may include the near and the far end terminal and their respective codecs, and the networks. The system may select processing characteristics of the near end terminal based on characteristics of the communication path. Selecting the processing characteristics may include selecting a predetermined operation. The system may adapt a selected operation based on a real time analysis of the communication path.

13 Claims, 4 Drawing Sheets

U.S. PATENT DOCUMENTS

| | | | | |
|---|---|---|---|---|
| 5,659,581 | A * | 8/1997 | Betts et al. | 375/296 |
| 5,721,730 | A * | 2/1998 | Genter | 370/288 |
| 5,784,361 | A * | 7/1998 | Bielsker | 370/286 |
| 5,991,292 | A * | 11/1999 | Focsaneanu et al. | 370/352 |
| 5,995,512 | A * | 11/1999 | Pogue, Jr. | 370/419 |
| 6,011,804 | A * | 1/2000 | Bertin et al. | 370/468 |
| 6,044,068 | A * | 3/2000 | El Malki | 370/286 |
| 6,240,513 | B1 * | 5/2001 | Friedman et al. | 713/152 |
| 6,285,660 | B1 * | 9/2001 | Ronen | 370/259 |
| 6,292,559 | B1 * | 9/2001 | Gaikwad et al. | 379/417 |
| 6,493,338 | B1 | 12/2002 | Preston et al. | |
| 6,498,850 | B1 * | 12/2002 | Walker et al. | 379/406.01 |
| 6,574,336 | B1 * | 6/2003 | Kirla | 379/406.01 |
| 6,618,385 | B1 * | 9/2003 | Cousins | 370/401 |
| 6,628,779 | B1 * | 9/2003 | Pietrowicz | 379/404 |
| 6,690,681 | B1 | 2/2004 | Preston et al. | |
| 6,741,874 | B1 * | 5/2004 | Novorita et al. | 455/570 |
| 6,771,629 | B1 | 8/2004 | Preston et al. | |
| 6,961,422 | B2 * | 11/2005 | Boland | 379/406.05 |
| 7,142,533 | B2 * | 11/2006 | Ghobrial et al. | 370/352 |
| 7,366,161 | B2 * | 4/2008 | Mitchell et al. | 370/352 |
| 2001/0006511 | A1 | 7/2001 | Matt | |
| 2004/0146302 | A1 * | 7/2004 | Balland et al. | 398/94 |
| 2006/0238821 | A1 * | 10/2006 | Ratcliff | 358/400 |
| 2009/0112579 | A1 | 4/2009 | Li et al. | |
| 2009/0112584 | A1 | 4/2009 | Li et al. | |

OTHER PUBLICATIONS

Ephraim, Y. et al., "Speech Enhancement Using a Minimum Mean-Square Error Log-Spectral Amplitude Estimator," *IEEE Transactions on Acoustic, Speech, and Signal Processing*, vol. ASSP-33, No. 2, Apr. 1985, pp. 443-445.

Ephraim, Yariv et al., "Speech Enhancement Using a Minimum Mean-Square Error Short-Time Spectral Amplitude Estimator," *IEEE Transactions on Acoustics, Speech, and Signal Processing*, vol. ASSP-32, No. 6, Dec. 1984, pp. 1109-1121.

* cited by examiner

NETWORK DEPENDENT SIGNAL PROCESSING

PRIORITY CLAIM

This application claims the benefit of priority from U.S. Provisional Application No. 60/704,065, filed Jul. 28, 2005, which is incorporated herein by reference.

BACKGROUND OF THE INVENTION

1. Technical Field

The invention relates to acoustics, and more particularly, to systems for processing audio signals to enhance a perceived quality of a processed signal.

2. Related Art

The audio quality of a phone call may depend on the characteristics of telephone terminals at either end of a communication path between the terminals, as well as the networks that provide signals for the terminals. This is true of mobile telephone terminals and their supporting networks. Different mobile networks may have different characteristics that affect the quality of phone calls. A network may exhibit different characteristics in different locations, since network characteristics (e.g., gain, spectral features, distortions, signal continuity, duplexing characteristics) may change in time or change with geography. Further, a network may exhibit different characteristics when receiving signals from different types of networks and telephone terminals that may include the communication path, since each network may work with a particular set of telephone terminals, ideally situated on the same network.

A need exists for systems which may obtain and use information about the terminals and networks that may support a telephone call and may modify their processing characteristics to improve the quality of audio signals transmitted during a telephone call.

SUMMARY

A system processes signals exchanged between a near end terminal and a far end terminal over a telecommunication path. The system selects the processing characteristics of a near end terminal based on characteristics of the telecommunications path. The telecommunications path may include the near end and a far end terminal and their respective codecs, and networks which convey telecommunications signals to the near end and far end terminals. The system may select processing characteristics of the near end terminal based on characteristics of the telecommunications path. Selecting the processing characteristics may include selecting a predetermined operation mode. The system may adapt a selected operation mode based on a real time analysis of the telecommunication path.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Systems for network dependent processing of signals exchanged between a near end terminal and a far end terminal over a communication path may improve the quality of exchanged signals. One system selects an operation mode of the near end terminal based on one or more characteristics of a communication path. The communication path may include a near end terminal and a far end terminal and their respective codecs, and the networks which provide communication signals to the near end and far end terminals. The near end terminal may have a number of predetermined operation modes. The system may select one of the operation modes based on identified characteristics of the communication path. The system may adapt a selected operation mode based on a real time analysis of the communication path.

Figure 1:
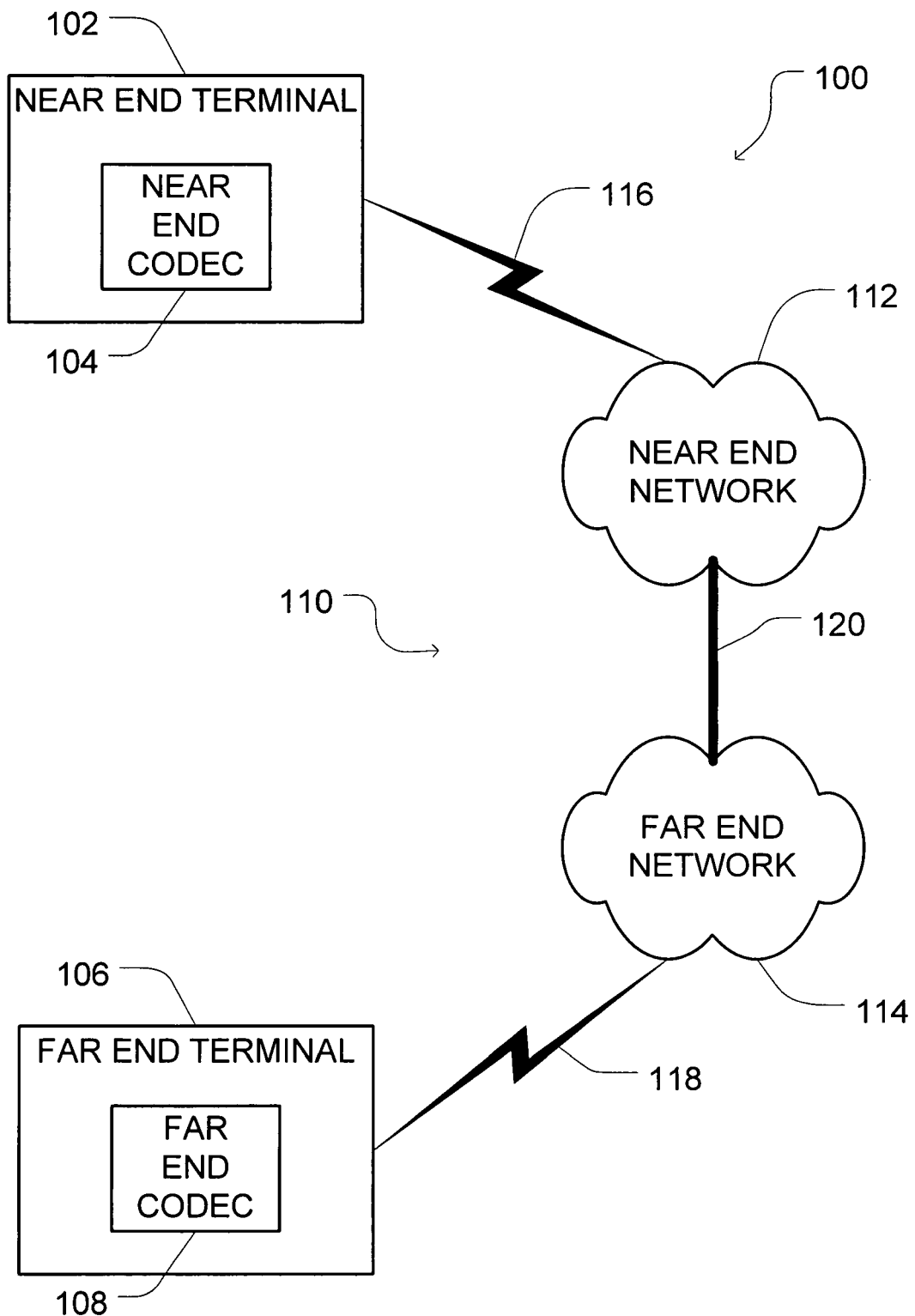
FIG. 1 illustrates a communication path between a near end terminal and a far end terminal.

FIG. 1 illustrates a telecommunication system 100. The telecommunication system 100 comprises a near end terminal 102 and a near end codec 104 which exchanges signals with a far end terminal 106 and a far end codec 108 through a wireless or communication path 110. The wireless or communication path 110 may comprise a near end network 112 and a far end network 114. The near end network 112 communicates with the near end terminal 102 through a near end communication signal 116. The far end network 114 communicates with the far end terminal 106 through a far end communication signal 118. The near end network 112 and far end network 114 may communicate through a network interface 120. The network interface 120 may comprise a switched network, a satellite communications link, a wireless link, a landline or other telecommunication media.

The near end terminal 102 may comprise a mobile communication device such as a telematics device. A telematics device may include a wireless device a hands-free device such as a telephone system interfaced to a vehicle. The near end terminal 102 may include a standard operation mode configured to the near end codec 104 and the near end network 112 which may provide the near end communication signal 116 (collectively referred to as the "near side configuration"). The standard operation mode may be customized based on a priori knowledge of the near side configuration. The near side configuration may be stable with respect to time and geography, or may be adapted in time and with geography.

The far end terminal 106 may also comprise a telematics device. A telematics device may include a wireless device such as a mobile telecommunication or a hands-free telephone system interfaced to a vehicle. The far end terminal 106 may include analog landline devices, digital landline devices, wireless landline devices, analog wireless devices, digital Code Division Multiple Axis (CDMA) wireless devices, digital Time Division Multiple Access (TDMA) wireless devices, digital Global System for Module Communications (GSM) wireless devices, hands-free conference speakerphones, hands-free desktop speakerphones, call center devices, Automatic Speech Recognition (ASR) systems, and server based telephony applications. The far end terminal 106 may exchange signals with the near end terminal 102 through the characteristics of the communication path 110. The far end terminal may be adapted to the far end codec 108 and the far end network 114 which may provide the far end communication signal 118 (collectively referred to as the "far side configuration").

Figure 2:
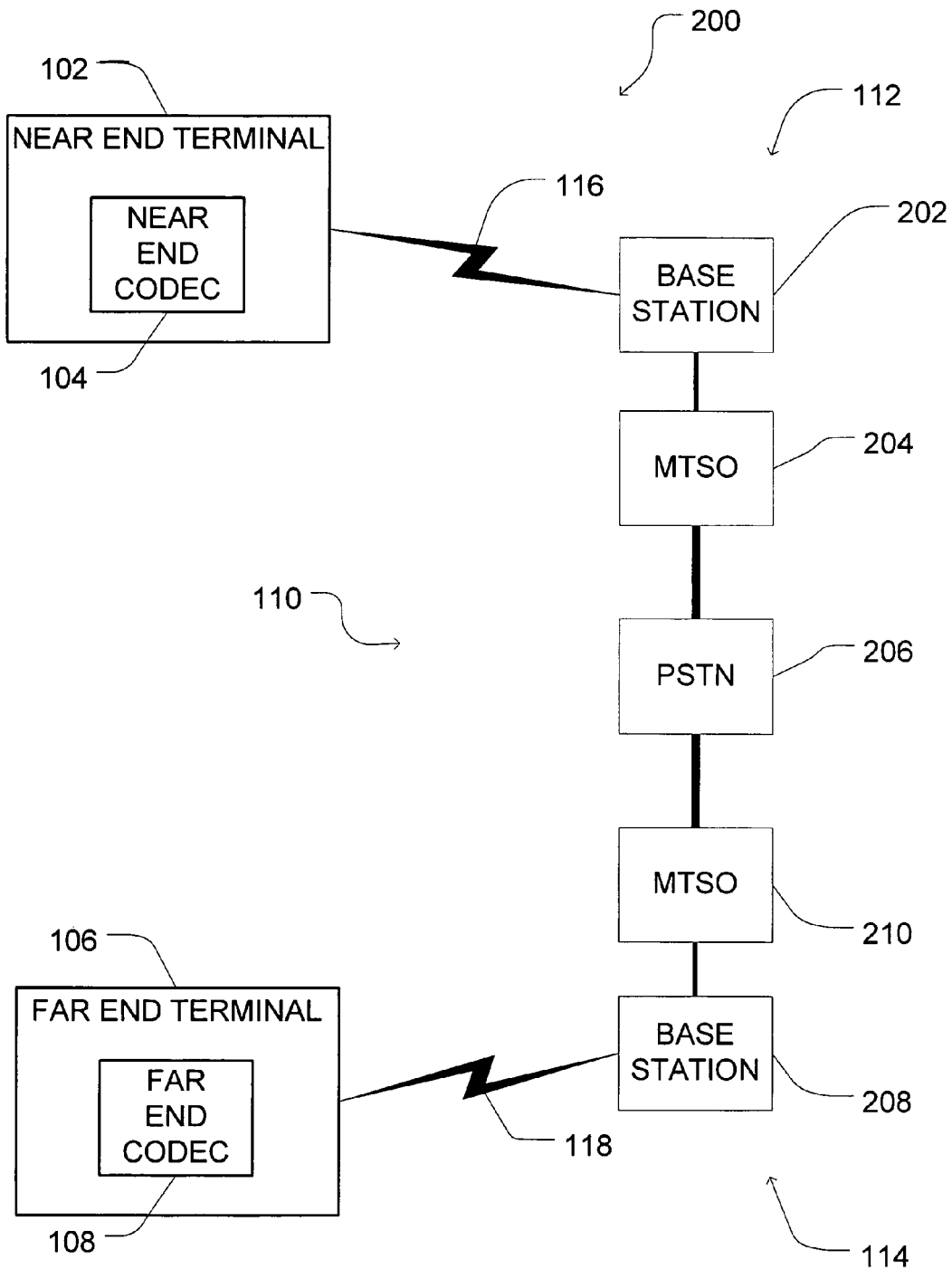
FIG. 2 illustrates a second communication path between a near end terminal and a far end terminal.
Figure 3:
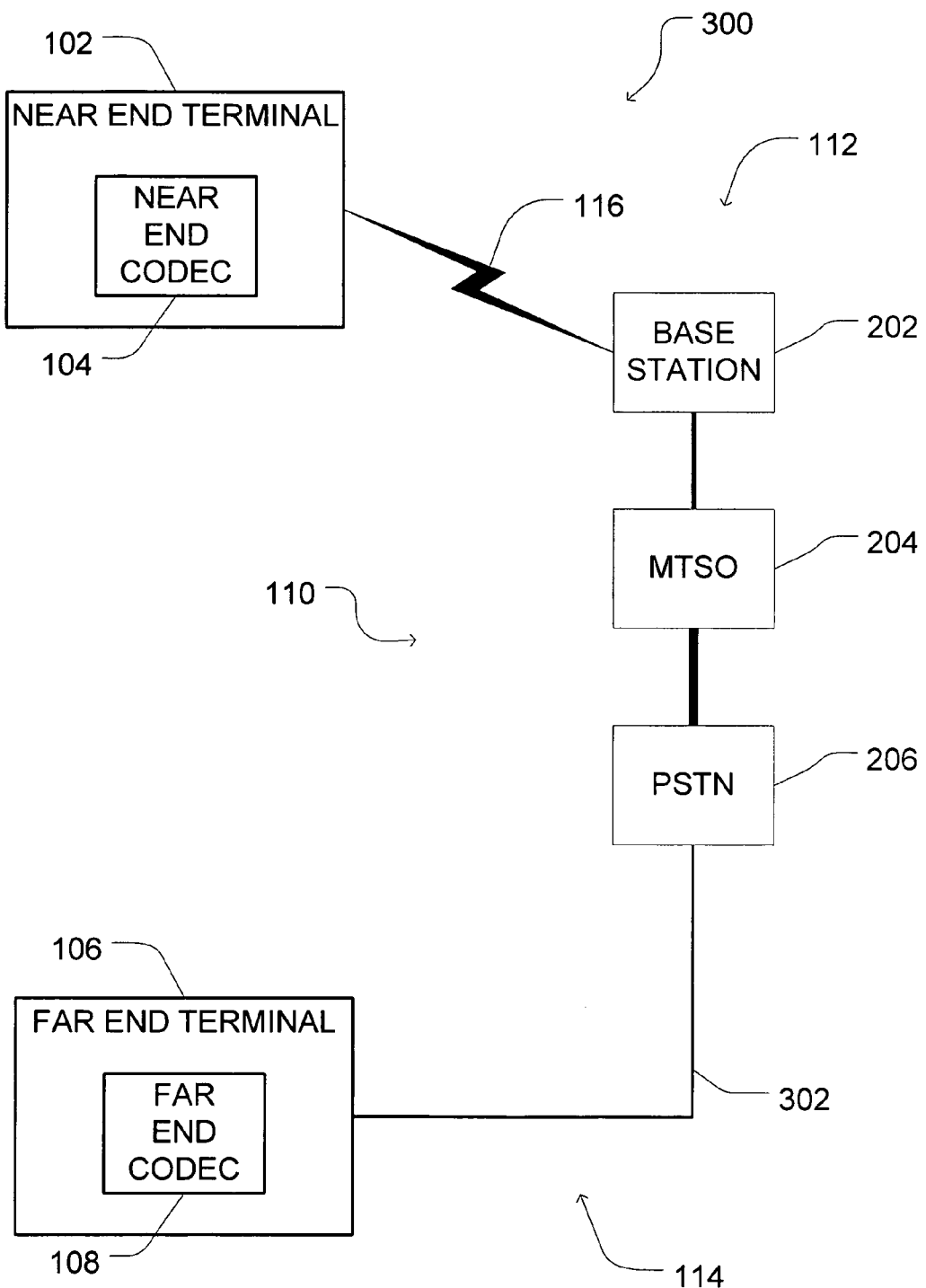
FIG. 3 illustrates a third communication path between a near end terminal and a far end terminal.

FIG. 2 illustrates an example telecommunication system 200 where the near end network 112 includes a base station 202 which provides a near end communication signal 116 to and from the near end terminal 102, and a Mobile Telephone Switching Office (MTSO) 204. The MTSO 204 connects the base station 202, along with one or more other base stations (not shown), to a Public Switched Telephone Network (PSTN) 206. The far end network 114 of FIG. 2 likewise comprises a base station 208 which provides the far end communication signal 118 to and from the far end terminal 106, and a MTSO 210 which connects the base station 208 to the PSTN 206. FIG. 3 illustrates another telecommunication system 300 wherein the far end terminal 106 is stationary. In FIG. 3 the far end network 114 comprises a landline 302 connecting the far end terminal 106 to the PSTN 206.

Figure 4:
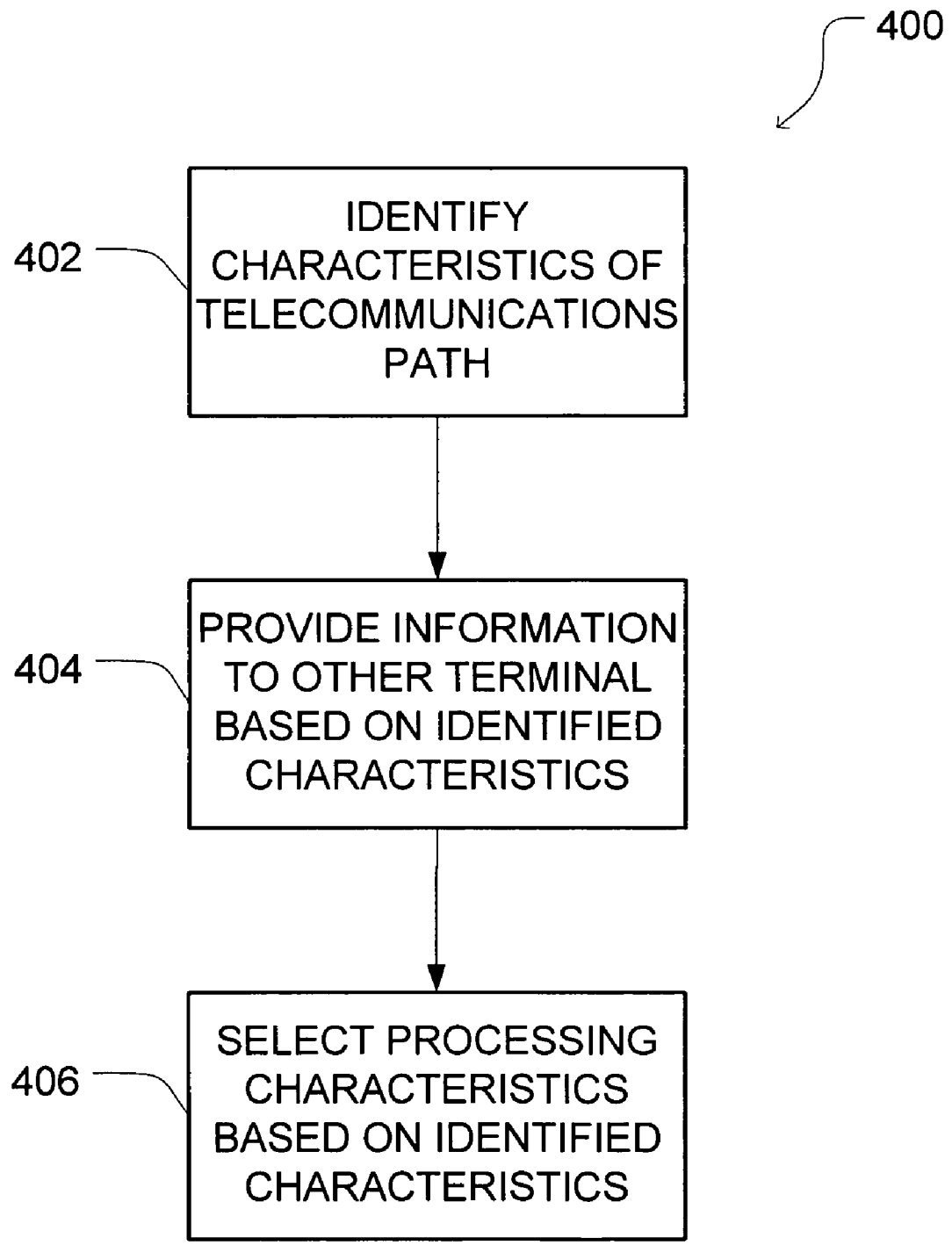
FIG. 4 shows a method of processing signals exchanged over a telecommunications path.

FIG. 4 illustrates a method 400 for processing signals exchanged between the near end terminal 102 and the far end terminal 106. The method 400 may be carried out when a telephone call or another exchange of signals between the near end terminal 102 and the far end terminal 106 is initiated. The method 400 may also be carried out periodically during the exchange of signals to accommodate any changes in the near side and/or far side configurations which occur during the exchange of signals. Changes in the near side and/or far side configurations may occur for many reasons, including traffic on the near end network 112 and/or the far end network 114, and changes in the geographical location of the near end terminal 102 and/or the far end terminal 106. Method 400 may be carried out by software running on the near end terminal 102. Also, in some instances, method 400 may be optionally carried out through software running on the far end terminal 106.

At act 402, characteristics of the communication path 110 are identified. Characteristics of the communication path 110 may be identified in real time by the near end codec 104. Identification of characteristics of the communication path 110 may be accomplished, for example and without limitation, by:

(1) detecting processing characteristics of the near end terminal 102;
(2) detecting processing characteristics of the far end terminal 106;
(3) detecting processing characteristics of the near end codec 104;
(4) detecting processing characteristics of the far end codec 108;
(5) detecting characteristics of the near end network 112;
(6) detecting characteristics of the far end networks 114;
(7) detecting the bit rate of the near end network 112;
(8) detecting the bit rate of the far end network 114;
(9) detecting noise gating on the near end network 112;
(10) detecting noise gating on the far end network 114;
(11) detecting noise reduction or noise cancellation on the near end network 112;
(12) detecting noise reduction or noise cancellation on the far end network 114;
(13) detecting noise reduction or noise cancellation on the near end terminal 102;
(14) detecting noise reduction or noise cancellation on the far end terminal 106;
(15) detecting less than full-duplex operation of the two way signal between the near end terminal 102 and the far end terminal 106;
(16) analyzing characteristics of a far side echo (e.g., produced when a signal is played through speakers and then detected by a microphone on the same side, resulting in an echo back to the other side), before the far side echo is removed; and/or,
(17) making an approximation of an input signal at the far end terminal 106 and comparing the approximation of the input signal to an incoming signal actually received at the near end terminal 102 to approximate certain network effects.

The identification of characteristics of the communication path 110 at act 402 may also be identified by other methods. For example, an engineering mode of the near end terminal 102 and/or the far end terminal 106 may be used to access information about the characteristics of the communication path 110. As another example, in telecommunication systems including a base station and MTSO (e.g., systems 200 and 300 of FIGS. 2 and 3, respectively), the base station and/or the MTSO may be provided with software for receiving and responding to queries or requests from the near end terminal 102. In such situations, the near end terminal 102 may query or send a request to the base station 202 and/or the MTSO 204 in order to identify characteristics of the communication path 110 at act 402. As another example, the near end terminal 102 may query or send a request to the far end terminal 106 in order to identify characteristics of the communication path 110 at act 402. Information received from the base station 202, the MTSO 204 and/or the far end terminal 106 may include, for example:

(1) processing characteristics of the far end terminal 106;
(2) processing characteristics of the far end codec 108;
(3) the type (i.e., CDMA, GSM, etc.) of the near end network 112;
(4) the type (i.e., CDMA, GSM, etc.) of the far end network 114;
(5) the network ID of the near end network 112;
(6) the network ID of the far end network 114;
(7) the field strength of the near end network 112; and/or,
(8) the field strength of the far end network 114.

The method 400 may include an optional act 404, wherein the near end terminal 102 may provide information to the far end terminal 106 based on the identified characteristics. The method 400 may include selecting processing characteristics of the far end terminal 106 based on the information provided from the near end terminal 102. In some situations, the far end terminal 106 may also include software or firmware for carrying out the method 400. The near end terminal 102 may receive information about the far side configuration and identify further characteristics of the communication path 110 from such information. Examples of information exchanged between the near end terminal 102 and the far end terminal 106 at act 404 include, for example:

(1) processing characteristics of the near end terminal 102;
(2) processing characteristics of the far end terminal 106;
(3) processing characteristics of the near end codec 104;
(4) processing characteristics of the far end codec 108;
(5) the type (i.e., CDMA, GSM, etc.) of the near end network 112;
(6) the type (i.e., CDMA, GSM, etc.) of the far end network 114;
(7) the network ID of the near end network 112;
(8) the network ID of the far end network 114;

(9) the field strength of the near end network 112; and/or,
(10) the field strength of the far end network 114.

At act 406, processing characteristics of the near end terminal 102 are selected based on the characteristics identified at act 402. A plurality of predetermined operation modes for the near end terminal 102 may be provided. Each of the predetermined operation modes may correspond to a known far side configuration, and may be configured for optimized exchange of signals with the corresponding known far side configuration. The predetermined operation mode most appropriate for the characteristics identified at act 402 may be selected at act 406. For example, selecting the predetermined operation mode may comprise selecting one of a plurality of predetermined operation modes corresponding to a known far side configuration having characteristics closest to the characteristics identified at act 402. Selection of processing characteristics for the near end terminal 102 may also comprise adaptation of one of the predetermined operation modes based on real time requests or queries of the characteristics of the communication path 110. For example, if the bit rate detected on a CDMA network at act 402 degrades for more than a predetermined length of time, thus resulting in lower signal quality, act 406 may involve adaptive modification of various signal processing algorithms to provide less complex processing with less noise reduction or noise cancellation in order to produce better quality output (e.g., less musical background).

In another example, if noise gating is identified at act 402 on either the near end network 112 or the far end network 114 or both, act 406 may involve techniques to reduce or remove the effect of noise gating interacting with the processing characteristics of the near end terminal 102. One such method introduces energy into the signal.

In another example, if significant noise reduction or noise cancellation is detected on one or more of the near end network 112, the far end network 114, the near end terminal 102, and the far end terminal 106, act 406 may include an adaptive modification of processing to alternative algorithms optimized for such noise reduction or noise cancellation. One such algorithm may apply less noise reduction or noise cancellation at the near end terminal 102. Another such algorithm may apply various signal processing algorithms configured for use with communication paths in which significant noise reduction or noise cancellation is performed beyond the near end terminal 102. Another such algorithm may apply an entirely different type of noise reduction or noise cancellation, and possibly also a different type of voice enhancement, as compared to the situation in which significant noise reduction or noise cancellation is not performed elsewhere in the communication path 110 beyond the near end terminal 102.

If at act 402 the near end network 112 and/or far end network 114 are determined to be a CDMA network, for instance, act 406 may involve adaptive modification of various algorithms to those more suited for CDMA networks (e.g., to adjust for noise gating, bit rate degradation). If at act 402 the near end network 112 and/or the far end network 114 is determined to be a GSM network, act 406 may involve adaptively removing GSM interference artifacts (e.g., GSM buzz). If at act 402 the near end and/or far end network Identification (ID) corresponds to a near end network and/or far end network known to exhibit some or a significant noise reduction or cancellation, act 406 may involve applying a reduced amount of noise reduction or noise cancellation, as compared to the situation in which significant noise reduction or noise cancellation is not performed elsewhere in the communication path 110 beyond the near end terminal 102. Act 406 may also involve applying a different type of noise reduction or noise cancellation and/or a different type of voice enhancement, as compared to the situation in which significant noise reduction or noise cancellation is not performed elsewhere in the communication path 110 beyond the near end terminal 102.

Certain implementations of the systems described include computer processors that execute software instructions that cause the processors to perform a method for processing signals. One or more processors in a mobile or wireless communication device may implement the method 400 of FIG. 4 by executing software instructions in a program memory accessible to the processors. The program product may include any medium which carries a set of computer-readable signals comprising instructions which, when executed by a data processor, cause the data processor to execute a method for processing signals. Such program products may interface another device or standalone. The program product may include physical media such as magnetic data storage media including floppy diskettes, hard disk drives, optical data storage media including Compact Disk Read Only Memory (CD ROMs), Digital Video Disc (DVDs), electronic data storage media including ROMs, Flash Random Access Memory (flash RAM), or the like or transmission-type media such as digital or analog communication links. In some systems the instructions may be compressed and/or encoded.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for processing signals exchanged over a communication path between a near end terminal and a far end terminal, the method comprising:
   identifying one or more remote characteristics of the communication path;
   selecting processing characteristics for the near end terminal based on the one or more characteristics;
   where selecting processing characteristics for the near end terminal comprises selecting a predetermined operation mode for the near end terminal comprises adaptation of the predetermined operation mode based on real time queries of the one or more characteristics of the communication path; and
   where adaptation of the predetermined operation mode comprise at least one of:
   adaptation of noise reduction or noise cancellation processing characteristics of the near end terminal based on the real time queries of a bit rate of a CDMA network upon determining the bit rate to have been degraded for more than a predetermined length of time;
   reducing or removing an effect of noise gating interacting with the processing characteristics of the near end terminal, upon identifying noise gating of a near end network which provides a communication signal to and from the near end terminal and a far end network which provides a communication signal to and from the far end terminal;
   adaptation of noise reduction or noise cancellation processing characteristics of the near end terminal upon detection of significant noise reduction or noise cancellation on at least one of the far end terminal, a near end network which provides a communication signal to and from the near end terminal, and a far end network which provides a communication signal to and from the far end terminal;

adding energy into a communication signal; and where, if at least one of the near end network and far end network is a CDMA network, then selecting processing characteristics for the near end terminal comprises adaptively modifying a processing algorithm to adjust for noise gating and bit rate degradation; and where if at least one of the near end network and far end network is a GSM network, then selecting processing characteristics for the near end terminal comprises adaptively removing GSM artifacts.

2. A method for processing signals exchanged over a communication path between a near end terminal and a far end terminal, the method comprising:

identifying one or more characteristics of the communication path remote from the near end terminal;

selecting processing characteristics for the near end terminal based on the one or more characteristics;

providing information about the one or more characteristics to the far end terminal; and selecting processing characteristics for the far end terminal based on the provided information, where identifying the one or more characteristics comprises detecting processing characteristics of a near end network which provides a communication signal to and from the near end terminal, the far end terminal, a far end codec associated with the far end terminal, and a far end network which provides a communication signal to and from the far end terminal, and where detecting processing characteristics of the far end terminal, the near end network and the far end network comprises detecting at least one of a noise reduction and a noise cancellation.

3. A method for processing signals exchanged over a communication path between a near end terminal and a far end terminal, the method comprising:

identifying one or more characteristics of the communication path remote from the near end terminal;

selecting processing characteristics for the near end terminal based on the one or more characteristics;

providing information about the one or more characteristics to the far end terminal; and selecting processing characteristics for the far end terminal based on the provided information, where identifying the one or more characteristics comprises detecting processing characteristics of a near end network which provides a communication signal to and from the near end terminal, the far end terminal, a far end codec associated with the far end terminal, and a far end network which provides a communication signal to and from the far end terminal, and where detecting processing characteristics of the far end network comprises detecting at least one of a noise gating and a bit rate of the far end network.

4. A method for processing signals exchanged over a communication path between a near end terminal and a far end terminal, the method comprising:

identifying one or more characteristics of the communication path remote from the near end terminal;

selecting processing characteristics for the near end terminal based on the one or more characteristics;

providing information about the one or more characteristics to the far end terminal; and selecting processing characteristics for the far end terminal based on the provided information, where identifying the one or more characteristics comprises detecting processing characteristics of a near end network which provides a communication signal to and from the near end terminal, the far end terminal, a far end codec associated with the far end terminal, and a far end network which provides a communication signal to and from the far end terminal, and where detecting processing characteristics of the far end network comprises analyzing characteristics of a far side echo prior to removal of the far side echo from an incoming signal received at the near end terminal.

5. A method for processing signals exchanged over a communication path between a near end terminal and a far end terminal, the method comprising:

identifying one or more characteristics of the communication path remote from the near end terminal;

selecting processing characteristics for the near end terminal based on the one or more characteristics;

providing information about the one or more characteristics to the far end terminal; and selecting processing characteristics for the far end terminal based on the provided information, and where the communication path comprises a base station and a mobile telephone switching office, the method comprising receiving information about the communication path from at least one of the far end terminal, the base station and the mobile telephone switching office, where selection of the processing characteristic is based on the received information and the identified characteristics.

6. A method according to claim 5 where the received information includes at least one of:

information about processing characteristics of the far end terminal;

information about processing characteristics of a far end codec; and information about at least one of a type, a network identification, and a field strength of a far end network which provides a communication signal to and from the far end terminal.

7. A method according to claim 6 where, if at least one of the near end network and far end network is a CDMA network, then selecting processing characteristics for the near end terminal comprises adaptively modifying a processing algorithm to adjust for noise gating and bit rate degradation.

8. A method according to claim 7 where, if at least one of the near end network and far end network is a GSM network, then selecting processing characteristics for the near end terminal comprises adaptively removing GSM artifacts.

9. A method according to claim 7 where, if the network identification of at least one of the near end network and far end network corresponds to a network that exhibits significant noise reduction or noise cancellation, selecting processing characteristics for the near end terminal comprises applying a reduced amount of noise reduction or noise cancellation.

10. A method for processing signals exchanged over a communication path between a near end terminal and a far end terminal, the method comprising:

identifying one or more characteristics of the communication path remote from the near end terminal;

selecting processing characteristics for the near end terminal based on the one or more characteristics;

providing information about the one or more characteristics to the far end terminal; and selecting processing characteristics for the far end terminal based on the provided information, where selecting processing characteristics for the near end terminal comprises selecting a predetermined operation mode for the near end terminal, where selecting processing characteristics for the near end terminal further comprises adaptation of the predetermined operation mode based on real time queries of the one or more characteristics of the communication path, and where adaptation of the predetermined operation mode comprise at least one of:

adaptation of noise reduction or noise cancellation processing characteristics of the near end terminal based on the real time queries of a bit rate of a CDMA network upon determining the bit rate to have been degraded for more than a predetermined length of time;

reducing or removing an effect of noise gating interacting with the processing characteristics of the near end terminal, upon identifying noise gating of a near end network which provides a communication signal to and from the near end terminal and a far end network which provides a communication signal to and from the far end terminal; and adaptation of noise reduction or noise cancellation processing characteristics of the near end terminal upon detection of significant noise reduction or noise cancellation on at least one of the far end terminal, a near end network which provides a communication signal to and from the near end terminal and a far end network which provides a communication signal to and from the far end terminal.

11. A method according to claim 10 where adaptation of noise reduction or noise cancellation processing characteristics of the near end terminal comprises at least one of:

adaptive modification of various signal processing algorithms to provide a processing with a noise reduction or a noise cancellation; and modification of various signal processing algorithms configured for use with communication paths in which a noise reduction or noise cancellation is performed beyond the near end terminal.

12. A method according to claim 11 where the modified algorithms include decreasing the noise reduction or decreasing the noise cancellation at the near end terminal.

13. A method according to claim 10 further comprises adding energy into a communication signal.

* * * * *